June 24, 1947.    G. L. DIMMICK    2,422,954
SELECTIVE REFLECTOR
Filed Oct. 31, 1942
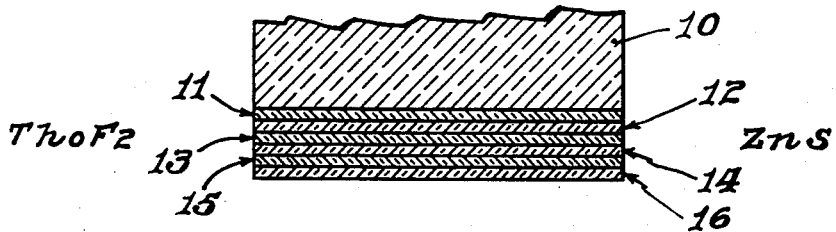
Inventor
Glenn L. Dimmick
By
C. D. Dusha
Attorney Patented June 24, 1947

2,422,954

UNITED STATES PATENT OFFICE 2,422,954

SELECTIVE REFLECTOR

Glenn L. Dimmick, Indianapolis, Ind., assignor to Radio Corporation of America, a corporation of Delaware Application October 31, 1942, Serial No. 464,018

6 Claims. (Cl. 88—105)

1

This invention relates to an improvement in selective reflectors and more particularly to an improvement in the type of selective reflectors adapted to reflect light of one color and to transmit light of the complementary color. This type of light divider or selective reflector has many applications but it is particularly useful in conjunction with a range finder of the general type described in the application of W. L. Douden. Serial No. 441,093, filed April 30, 1942, and is an improvement on the type of selective reflector described in my application, Serial No. 436,998, filed March 31, 1942, entitled "Dichroic reflector" and the type of selective reflector described in my application, Serial No. 452,481, filed July 27, 1942 entitled "Light divider." The selective filter of the present invention presents the advantage that the coating is considerably harder, more adherent and is less affected by salt water or other detrimental materials than the coating of the said earlier applications.

One object of the invention is to provide an improved selective reflector.

Another object of the invention is to provide a selective reflector which will reflect light of one color and transmit light of a complementary color.

Another object of the invention is to provide a selective reflector which is resistant to the deleterious effects of water, salt water, and alkaline solutions commonly encountered in practice.

Another object of the invention is to provide a selective reflector which is extremely hard.

Other and incidental objects of the invention will be apparent to those skilled in the art from a reading of the following specification and an inspection of the accompanying drawing, in which:

The single figure of drawing illustrates my improved selective reflector as applied to the surface of a transparent body such as a piece of glass.

In the drawing, the transparent support body or optical glass member is indicated at 10. On the surface of the glass there is placed a layer of thorium oxi-fluoride 11 having a thickness of one-quarter of the wave length of the chosen color of light. Where it is desired to have the selection occur at a specific wave length, the layer is accordingly made with a thickness of one-quarter of this wave length. On the surface of the layer 11 there is placed a layer 12 of transparent material, such as zinc sulphide, likewise having a thickness of one-quarter of the wave length. The third and fifth layer, 13 and 15, are one-quarter wave length layers of thorium oxi-

2 fluoride, like the first layer 11, and the fourth and sixth layers 14 and 16 are one-quarter wave length layers of zinc sulphide, like the second layer. I prefer to refer to the first, third and fifth layers as primary layers or coatings and to the others as secondary layers or coatings.

The thorium oxi-fluoride has an index of refraction of approximately 1.52 and the zinc sulphide has a higher index of refraction, of about 2.2. A mathematical analysis of the effect of superposed layers of material of different indices of refraction is given in my article entitled "A new dichroic reflector and its application to photocell monitoring systems" appearing on pages 36 to 44 of the January 1942 issue of the Journal of the Society of Motion Picture Engineers. Other secondary coating materials, having a higher index of refraction than the primary coating materials that could be used instead of zinc sulphide, include bismuth fluoride, lead fluoride and titanium dioxide.

The preparation and the procedure in evaporating materials for this type of reflector are quite important and are accordingly herein described in detail. Each of the materials is evaporated from a platinum boat in order to prevent any contamination of the material due to reactions between the material and the evaporating device.

The $ThOF_2$ is placed next to the glass, although it has substantially the same index of refraction, for the reason that zinc sulphide does not adhere firmly to the glass but the $ThOF_2$ adheres firmly to the glass even under unfavorable conditions and the zinc sulphide will adhere firmly to the evaporated layer of $ThOF_2$.

The $ThOF_2$ is prepared by heating monohydrated thorium fluoride $ThF_4 \cdot H_2O$ in a platinum crucible in a vacuum or in an inert gas. When the thorium fluoride is prepared from thorium nitrate and hydrofluoric acid, it takes the tetrahydrated form $ThF_4 \cdot H_2O$. When this tetrahydrated thorium fluoride is heated to 200° C. it gives off 3 molecules of water forming the monohydrate $ThF_4 \cdot H_2O$. If this monohydrate is heated in air to a red heat, it forms thorium oxide and hydrogen fluoride. If, however, the thorium fluoride monohydrate is heated to substantially red heat in a vacuum, the following reaction takes place $ThF_4 \cdot H_2O + heat = ThOF_2 + 2HF$. While there is reason to believe that the above compound $ThOF_2$ is formed, it is possible that the water of crystallization is merely driven off, leaving $ThF_4$, and I do not wish to be restricted to thorium oxi-fluoride when the resulting compound may be thorium fluoride.

The compound comprising thorium and fluorine prepared in this manner is placed in a platinum boat and heated to about 1000 degrees C. in a vacuum or inert atmosphere. I prefer to use the term inert atmosphere to include a vacuum or an inert gas. At this temperature it melts and evaporates and it may be evaporated onto the optical surface to an appropriate thickness. The evaporated film of this material after it has been baked for several hours at a temperature of 70° C. or somewhat higher, has a number of advantages over other types of films in that it repels water, it is extremely hard, it has a very low surface friction, it is not soluble in pure water, salt water, or in alkaline solutions, it forms a very good bond with the glass and it is clear and transparent without appreciable absorption in the visible spectrum. Certain types of glass are hygroscopic and this coating material seals the glass against moisture. I do not wish to be restricted to its use with glass since it would be a protective coating for other bodies.

The zinc sulphide used is of the very pure variety such as is prepared commercially for the fluorescent screens of cathode ray tubes. This material is likewise evaporated from a platinum boat in a vacuum at a temperature of about 1200° C. When this type of zinc sulphide is evaporated in this manner and thereafter baked at a temperature of 70° C. or higher for several hours, it is practically insoluble in water, salt water and alkaline solutions and is quite hard and is clear and transparent through the visible spectrum.

The thickness of the layers of material is controlled as described and claimed in my application Serial No. 372,811 filed January 2, 1941 now Patent No. 2,338,234 and entitled "Evaporation of transparent material on glass." In evaporating the materials for the selective reflector of the present invention, the optical path to the photocell described in the said application has inserted therein Wratten filters 2A, 45A and 48 in series. The compound of thorium and fluorine is first evaporated to form the first primary coating until the reflectivity reaches a minimum, then zinc sulphide is evaporated to form the first secondary coating until the maximum reflectivity is reached. Then this process is repeated until the desired number of primary and secondary coatings are formed. This procedure gives a reflectivity of about 48 percent in the blue-green with the remainder of the visible spectrum transmitted with negligible loss. The reason for selecting this particular color combination in the present instance is that this type of selective reflector is intended for use in range finders which are to be generally used against the blue sky for a background and the particular color combination chosen gives the best contrast of the images.

The completed reflector may be baked at a temperature of 175° C. for a period of about fourteen hours in order to secure a higher degree of hardness in the materials.

I claim as my invention:

1. A selective reflector comprising a transparent glass supporting body and alternate transparent layers, in the order named, of a compound comprising thorium and fluorine, produced by heating $ThF_4 \cdot H_2O$ in an inert atmosphere at a red heat, and zinc sulphide, said layers each having the optical thickness of one quarter wavelength of light of a given color.

2. An optical element including a transparent glass supporting body having on the surface thereof at least one transparent layer of a compound comprising thorium and fluorine produced by heating $ThF_4 \cdot H_2O$ in an inert atmosphere at a red heat.

3. A selective reflector comprising a transparent glass body having on its surface a primary transparent layer of a compound comprising thorium and fluorine produced by heating $ThF_4 \cdot H_2O$ in an inert atmosphere at a red heat, and a secondary layer of transparent material having an index of refraction higher than that of said compound, each of said layers having an optical thickness approximately equal to one quarter of the wavelength of light of a given color.

4. The invention as set forth in claim 3 wherein said secondary layer is zinc sulphide 5. A selective reflector comprising a transparent glass body having on its surface superposed alternate transparent layers of different indices of refraction, the layer next adjacent said body being a compound comprising thorium and fluorine produced by heating $ThF_4 \cdot H_2O$ in an inert atmosphere at a red heat, said layers each having a thickness of one-quarter wave length of a given color of light.

6. An optical element comprising a transparent glass supporting body and a transparent surface layer of a compound comprising thorium and fluorine produced by heating $ThF_4 \cdot H_2O$ in an inert atmosphere at a red heat forming a protective coating characterized by hardness, smoothness, and chemical resistance to water, salt water and alkaline solutions.

GLENN L. DIMMICK.

REFERENCES CITED

The following references are of record in the file of this patent:

UNITED STATES PATENTS

| Number | Name | Date |
| --- | --- | --- |
| 2,207,656 | Cartwright | July 9, 1940 |
| 2,301,456 | Sabine | Nov. 10, 1942 |
| 2,252,770 | Jones | Aug. 19, 1941 |
| 2,281,474 | Cartwright et al. | Apr. 28, 1942 |
| 1,181,754 | Ferriter | May 2, 1916 |
| 1,989,824 | Rennie | Feb. 4, 1935 |
| 1,176,313 | Pfund | Mar. 21, 1916 |
| 1,222,049 | Tillyer | Apr. 10, 1917 |
| 2,289,054 | Dimmick | July 7, 1942 |

FOREIGN PATENTS

| Number | Country | Date |
| --- | --- | --- |
| 492,871 | Great Britain | Sept. 28, 1938 |

OTHER REFERENCES

Cartwright et al., in Phy. Rev., vol. 55, June 1, 1939, page 1128.

Pfund, J. O. S. A., vol. 24, 1934, pp. 99–102.

Mellor, Treatise on Inorganic and Theoretical Chemistry, vol. 7, p. 227. Publ. 1927 Longmans, Green & Co., 55 5th Ave., New York.

Thorpe, Dictionary of Applied Chemistry, vol. V, page 478, 1916 (same publ. as above).